United States Patent [19]

Dent

[11] Patent Number: 5,430,760
[45] Date of Patent: Jul. 4, 1995

[54] RANDOM ACCESS IN MOBILE RADIO TELEPHONE SYSTEMS

[75] Inventor: Paul W. Dent, Stehag, Sweden

[73] Assignee: Ericsson GE Mobile Communications Inc., Paramus, N.J.

[21] Appl. No.: 222,008

[22] Filed: Apr. 4, 1994

Related U.S. Application Data

[63] Continuation of Ser. No. 867,149, Apr. 10, 1992.

[51] Int. Cl.[6] .................... H04J 13/04; H04B 7/216
[52] U.S. Cl. .................... 375/200; 455/54.2; 455/70
[58] Field of Search ............ 375/1; 455/70, 54.2

[56] References Cited

U.S. PATENT DOCUMENTS

| | | | |
|---|---|---|---|
| 4,222,115 | 9/1980 | Cooper et al. | 375/1 |
| 4,435,840 | 3/1984 | Kojima et al. | 455/33 |
| 4,485,486 | 11/1984 | Webb et al. | 455/54.2 |
| 4,613,990 | 9/1986 | Halpern | 455/33 |
| 4,677,687 | 6/1987 | Matsuo | 455/10 |
| 4,694,467 | 9/1987 | Mui | 375/1 |
| 4,696,027 | 9/1987 | Bonta | 379/60 |
| 4,811,421 | 3/1989 | Havel et al. | 455/67.1 X |
| 4,870,698 | 9/1989 | Katsuyama et al. | 455/67.1 |
| 4,984,247 | 1/1991 | Kaufmann et al. | 375/1 |
| 5,056,109 | 10/1991 | Gilhousen et al. | 375/1 |
| 5,151,919 | 9/1992 | Dent | 375/1 |

FOREIGN PATENT DOCUMENTS

0288904 11/1988 European Pat. Off.
0361299 4/1990 European Pat. Off.
WO91/07037 5/1991 WIPO.

OTHER PUBLICATIONS

Patent Abstracts of Japan, vol. 15, No. 3 (E-1019) 7 Jan. 1990, & JP-A-02 256 331 (Sharp), 17 Oct. 1990.
Patent Abstracts of Japan, vol. 16, No. 188 (E-1198) 7 May 1992, & JP-A-04 023 623 (NEC Corp), 28 Jan. 1992.
Thompson et al., "Automatic Power Control in the PTARMIGAN SCRA Sybsystem," *IEE Conference Publication No. 139*, 1976.

*Primary Examiner*—Gilberto Barrón, Jr.
*Attorney, Agent, or Firm*—Burns, Doane, Swecker & Mathis

[57] ABSTRACT

The present invention includes a system and method for minimizing interference between two radio stations, e.g., a mobile radio telephone and a fixed base station, at the initiation of a radio communication. A mobile station initiates a random access at the lowest power level and increases the transmission power level until the base station detects the access signal. Once detected, the power level of the message is maintained at the detected level so that the signal interference is avoided. The present invention also provides a mechanism for synchronizing random access communications between mobile stations and the base station despite variation in distances between the mobile and base stations.

43 Claims, 6 Drawing Sheets

USING SCRAMBLING CODE NO. 1.:-

USING SCRAMBLING CODE NO. 2.:-

USING SCRAMBLING CODE NO. 3.:-

RANDOM ACCESS IN MOBILE RADIO TELEPHONE SYSTEMS

This application is a continuation of application Ser. No. 07/867,149, filed Apr. 10, 1992.

BACKGROUND OF THE INVENTION

1. Field of the Invention

The present invention relates to systems for minimizing interference caused by mobile radio stations initiating and terminating communication with fixed radio stations.

2. Description of Related Art

In cellular radio telephone networks, a mobile subscriber may freely choose when and where to initiate a telephone call. This procedure is known as a random access call set-up. The term random access also applies to the mobile station's first transmission in reply to a call initiated through the mobile station's fixed home base station. In both situations, significant uncertainty exists in determining the mobile's transmission power level at the time of access.

Three principal methods enable a radio telephone system to support multiple, ongoing conversations in a given frequency band. Frequency Division Multiple Access (FDMA) is the traditional method, where every call connection between a mobile and a base station is allocated a unique frequency channel that is occupied continuously until the end of the call. At present, mobile telephone systems are changing from FDMA to time-based methods of sharing communications resources. In Time Division Multiple Access (TDMA), different radio transmitters are allocated short time slots in a periodic cycle in which they transmit bursts of information. In the third approach, Code Division Multiple Access (CDMA), different speech/information signals are transmitted with different spread-spectrum codes so that the coded signals overlap in both time and frequency. The received CDMA signals are decoded by correlation with the code associated with the desired speech/information signal.

In all mobile telephone systems, the physical distance between mobile stations and base stations varies significantly. The signal propagation loss between a radio transmitter and receiver varies as a function of the fourth power of their mutual distance. As a result, large differences may arise in the strength of signals received at the base station from different mobiles. Although conventional cellular radio telephone systems employ a number of techniques to avoid interference between different signals, interference occurs nonetheless as the disparity between the signal strengths from various mobiles increases.

This interference problem is of particular concern in CDMA systems where a mobile signal that is twice as strong as another mobile signal occupies twice the system capacity. Unregulated, it is not uncommon for a strong mobile station to transmit signals at thousands of times the strength of other mobile transmissions. The loss of system capacity to such "strong" mobile stations is unacceptable, and thus power regulation is particularly important in CDMA systems. In commonly assigned U.S. patent application Ser. No. 07/866,554, entitled "Duplex Power Control" filed on Apr. 10, 1992, the present inventor describes a power regulation method and apparatus for a CDMA system. That application is incorporated herein by reference.

In other pending applications by the present inventor, U.S. patent application Ser. No. 07/628,359, filed Dec. 17, 1990, and entitled "CDMA Subtractive Demodulation," now U.S. Pat. No. 5,151,919 and U.S. patent application Ser. No. 07/739,446, filed Aug. 2, 1991, and entitled "CDMA Subtractive Demodulation," now U.S. Pat. No. 5,218,619 incorporated herein by reference, a CDMA subtractive demodulation system is described in which overlapping, coded signals are decoded in the order of strongest to weakest signal strength. After each decoding, the decoded signal is removed or subtracted from the received, composite signal before decoding the next strongest signal. Using such a CDMA subtractive demodulation system, signal strength differences between mobiles become less important and capacity is increased. In other words, the signals having the greatest potential for causing interference, i.e., the strongest signals, are decoded and removed first. In this way, potential sources of interference for weaker signals are significantly reduced.

Even in such a CDMA subtractive demodulation system, however, an interference problem still exists when mobile stations initiate random access call set-ups. Because of the difficulty in gauging an appropriate access power level, there is a risk of at least momentarily interference with ongoing conversations.

Another source of potential interference to ongoing conversations during mobile random accesses is time misalignment of the mobile random access signals relative to the base station's frame timing. For mobile station signals to be received in a correct timeslot (TDMA) or correctly time-aligned to a particular correlating code (CDMA), the mobile station must adjust its access signal transmission timing to account for the round-trip propagation delay between the base and the mobile station. Unfortunately, unless a recent contact has been made with a base station, the mobile station lacks a mechanism for establishing the correct time alignment for a random access.

These problems undermine the efficient operation of current and future cellular systems. Given the frequency with which new calls are placed by mobile telephone subscribers, especially in urban and other congested areas, it is both desirable and necessary for mobiles to make random accesses on the network without generating unnecessary interference. It is also desirable to simply and effectively establish a call connection from mobile to base station that is synchronized with the time-alignment structure of the base station.

SUMMARY OF THE INVENTION

The present invention includes a method for minimizing the interference caused by radio communications initiated between at least one of a plurality of first radio stations and a second radio station. An access message is transmitted from the first radio station at a relatively low power level. A determination is made whether or not the access message has been detected at the second radio station. If the message has not been detected, the access message is retransmitted at an increased level until the message is eventually detected. When the message has been detected, the power level is fixed at the detected level.

The first station may be a mobile radio telephone station and the second station may be a base station. The access message itself includes an access code and an identification code identifying the first station. Each access message is preferably transmitted using spread spectrum signal coding including orthogonal block error-correction codes. Moreover, each access message is scrambled before transmission using a scrambling code selected from a reserved group of scrambling codes. When the base station has received the access message it acknowledges the receipt and commands the mobile station to discontinue power level increases. The acknowledgment may also include time alignment information that is used by the mobile station in conjunction with the access message transmission power level to determine the time when subsequent mobile communication transmissions should occur.

In one aspect of the invention, a mobile radio station for communicating with at least one other radio station includes means for transmitting an access message to another radio station at a relatively low power level. A detecting means determines if a reply message has been received from the other radio station. The mobile station has means for retransmitting the access message at an increased power level if the reply message is not detected. The retransmitting means increases the power level of the random access transmission in accordance with a ramp function. The mobile station also has means for selecting a scrambling code from a list of available scrambling codes broadcast from the other radio station to generate the random access message. The mobile station additionally has means for adjusting the time of transmission of the access message based on the increased power level.

In another aspect of the invention, a communication system including plural mobile radio telephone stations and at least one fixed base station is disclosed in which each mobile radio station has means for transmitting an access message initially at a relatively low power level; means for regulating the power level of said transmitting means; and control means for controlling said regulating means depending on whether said access message has been detected. The base station includes: means for receiving a composite of signals from said mobile stations; means for detecting mobile access messages; means for decoding detected access messages; and means for transmitting a reply message to the mobile station corresponding to detected access message.

The base station further includes means for ordering received signals that include access messages according to signal strength; means for selectively decoding the strongest signals; and means for removing the decoded signal from the received composite signal. The mobile station includes means for encoding scrambled access messages using bi-orthogonal block codes and means for scrambling access messages using scrambling codes. The base station transmitting means broadcasts a list of reserve scrambling codes separate from scrambling codes used for other radio communications.

The mobile station includes means for adjusting the time of transmission of the access message based on regulated power level and means for detecting time alignment information in the reply message. The base station includes means for determining the difference between the signal strength of the random access message detected in the base station and a predetermined signal strength, and means for determining a time difference between the times the random access was detected and a predetermined time. Finally, the base station detecting means searches for particular access messages at staggered time intervals.

BRIEF DESCRIPTION OF THE DRAWINGS

The features and advantages of the invention will become apparent from reading the following detailed description in conjunction with the drawings, in which.

DETAILED DESCRIPTION OF THE PREFERRED EMBODIMENT(S)

To facilitate an understanding of the invention, an exemplary embodiment in the context of the CDMA subtractive demodulation system such as disclosed in the above-incorporated U.S. patent application Ser. No. 07/628,359, now U.S. Pat. No. 5,151,919 is described. Those skilled in the art will recognize that the present invention may be applied to any radio communications system, including all cellular radio telephone systems, in which it is desirable to minimize interference caused by a random access call attempt between two radio communications devices.

Briefly summarized, in the CDMA subtractive demodulation system, information between plural mobile radio stations and the base station is transmitted in blocks of codewords, e.g., forty-two codewords per block. A convenient signal transmission format is sequences of 128-bit codewords transmitted serially over a radio communications channel. A radio receiver amplifies, filters, samples, and converts the received composite signal, which consists of overlapping communications signals, into digital form for processing. The digitized composite signal is descrambled with a unique scrambling code corresponding to the information signal having the greatest signal strength. The descrambled signal is correlated with "spreading" codes known as orthogonal (or bi-orthogonal) block codes that are associated with the information signals. The 128-bit signal samples are decoded by bi-orthogonal block decoder, by determining which block code has the best correlation to the sample signal, to produce an 8-bit information signal. The decoded information signal, i.e., eight bits, identifies which one of the 128-bit bi-orthogonal codes was transmitted, the latter then being subtracted from the composite signal before attempting to decode the next strongest, coded information signal.

Figure 1:
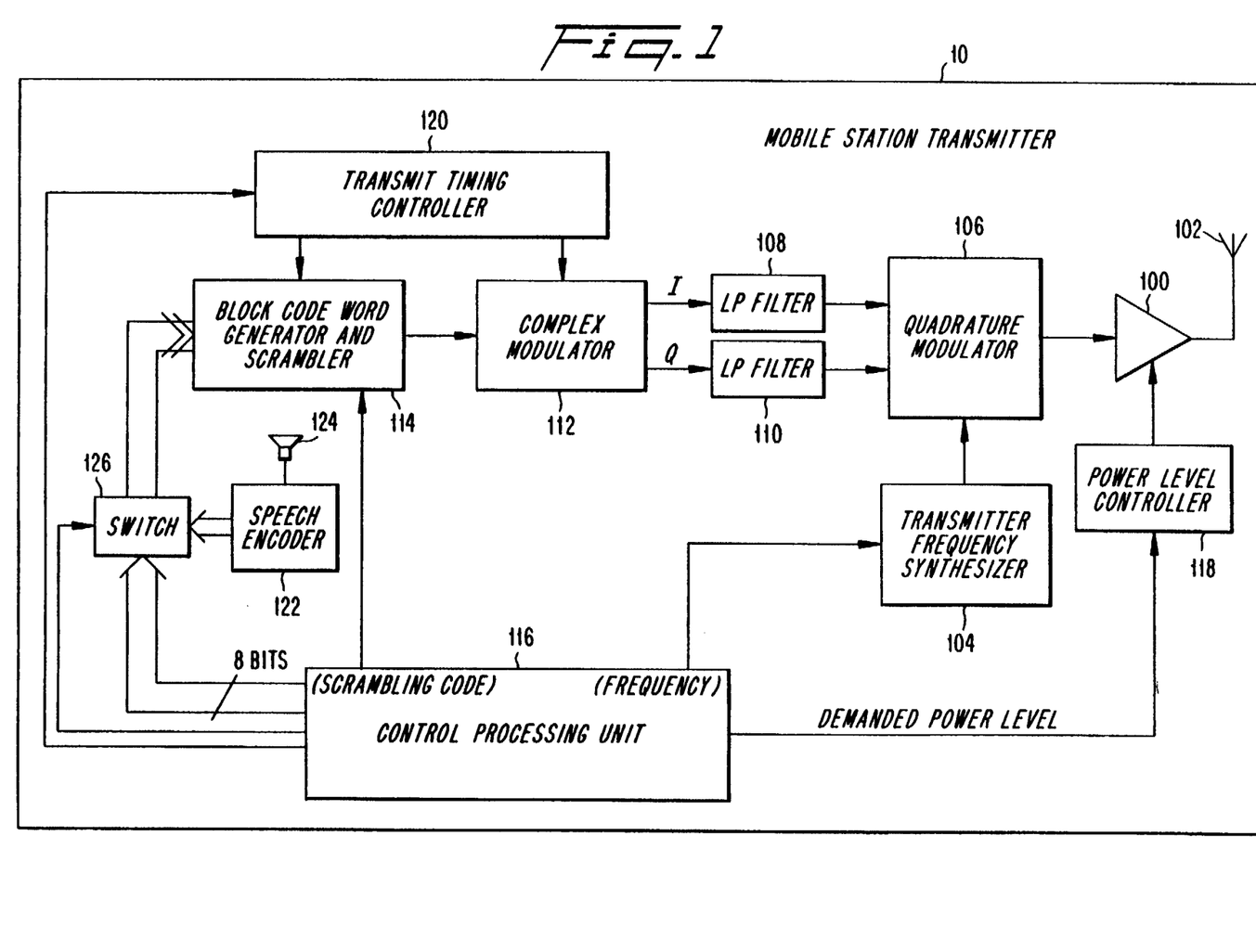
FIG. 1 is a functional schematic of the transmitter of a mobile station according to the present invention.
Figure 2:
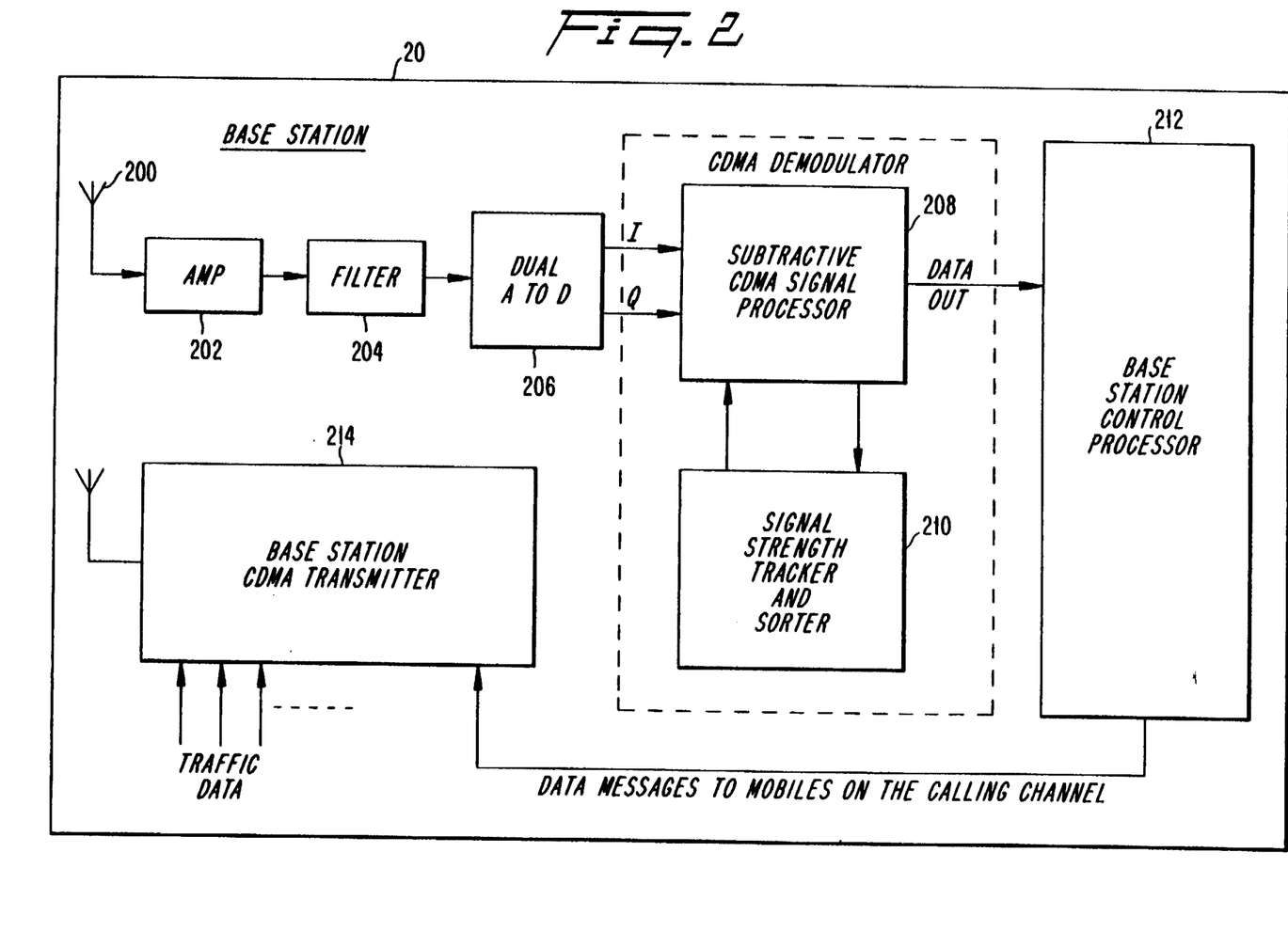
FIG. 2 is a functional schematic of a transceiver portion of a base station according to the present invention.

In an exemplary embodiment of the present invention illustrated in FIGS. 1 and 2, a mobile station transmitter 10 includes a radio frequency (RF) power amplifier 100 coupled to a duplex antenna 102. A frequency synthesizer 104 generates the transmission carrier waveform that is modulated with an information signal, e.g., speech, by a quadrature modulator 106. The quadrature modulator 106 may implement a modulation technique such as impulse-excited Quadrature Amplitude Modulation (QAM) in which information bits are modulated alternately on the in-phase (I) channel and the quadrature (Q) channel using the waveforms generated by two low-pass (LP) filters 108, 110. A complex modulator 112 calculates impulse response waveforms that correspond to the polarities of received digital information signals and converts those waveforms into analog form. The LP filters 108, 110 principally remove the digital-to-analog conversion sampling frequency components. Alternatively, the information signal may be mixed initially to a convenient intermediate frequency, and then converted to the higher carrier transmission frequency by heterodyne mixing the modulated intermediate frequency waveform with an offset frequency.

The digital information signals received by the complex modulator 112 are produced by either a block codeword generator and scrambler 114 or a speech encoder 122. When the mobile station 10 is transmitting a random access message, i.e., before speech communication begins, the message is generated in the control processing unit 166 and input to the block codeword generator and scrambler 114 eight bits at a time. However, when speech transmission commences, the eight bit inputs to block codeword generator and scrambler 114 come from a speech digitizer and encoder 122. The speech encoder 122 receives a microphone signal from a microphone 124 and outputs eight-bit words. A switch 126 controlled by the control processing unit 116. For input to the block codeword generator and scrambler 114, the control processing unit 116 selects either itself for transmission of random access messages or the speech encoder 122 for transmitting conversation. Even after the random access procedure is completed, the control processing unit 116 can operate the switch 126 from time to time to select message transmission and interrupt speech transmission. This is done, for example, for high priority signalling message exchange between the base station 20 and the mobile station 10, such as Fast Associated Control Channel (FACCH) messages.

In the block codeword generator and scrambler 114, eight bits of information may be spread using a suitable bi-orthogonal block code to a 128-bit codeword, for example. The 128-bit codeword may then be scrambled by modulo-2 adding a unique scrambling code to the codeword. The information bits and the scrambling code originate from a control processing unit 116 that also selects the carrier frequency to be generated by the frequency synthesizer 104 and transmits a power level command signal to a power level controller 118.

The power level controller 118 advantageously comprises a combination of attenuators and components for controlling the bias of the power amplifier 100 to achieve the commanded power level when transmitting each codeword. A combination of attenuators and amplifier bias control is useful in achieving a suitably wide transmission power level control range, e.g., 60 dB, and it will be appreciated that a wide variety of combinations are known and the following techniques can be used as desired in the present invention.

Because the power amplifier's final stage might be controllable within only a 20-dB power range, a wide transmission power control range is difficult to achieve by controlling the bias of only one stage of the power amplifier. Accordingly, for a two-stage power amplifier 100, controlling both stages would yield a 40-dB control range and providing a fixed 20-dB attenuator selectively switched into the output of the power amplifier can achieve the desired 60-dB range. Of course, if bias control of a single amplifier stage is preferred, two independently controllable 20-dB fixed attenuators may be selectively switched into the output, thereby achieving the same 60-dB control range. An example of a multi-stage power amplifier is shown in FIG. 5.

Figure 5:
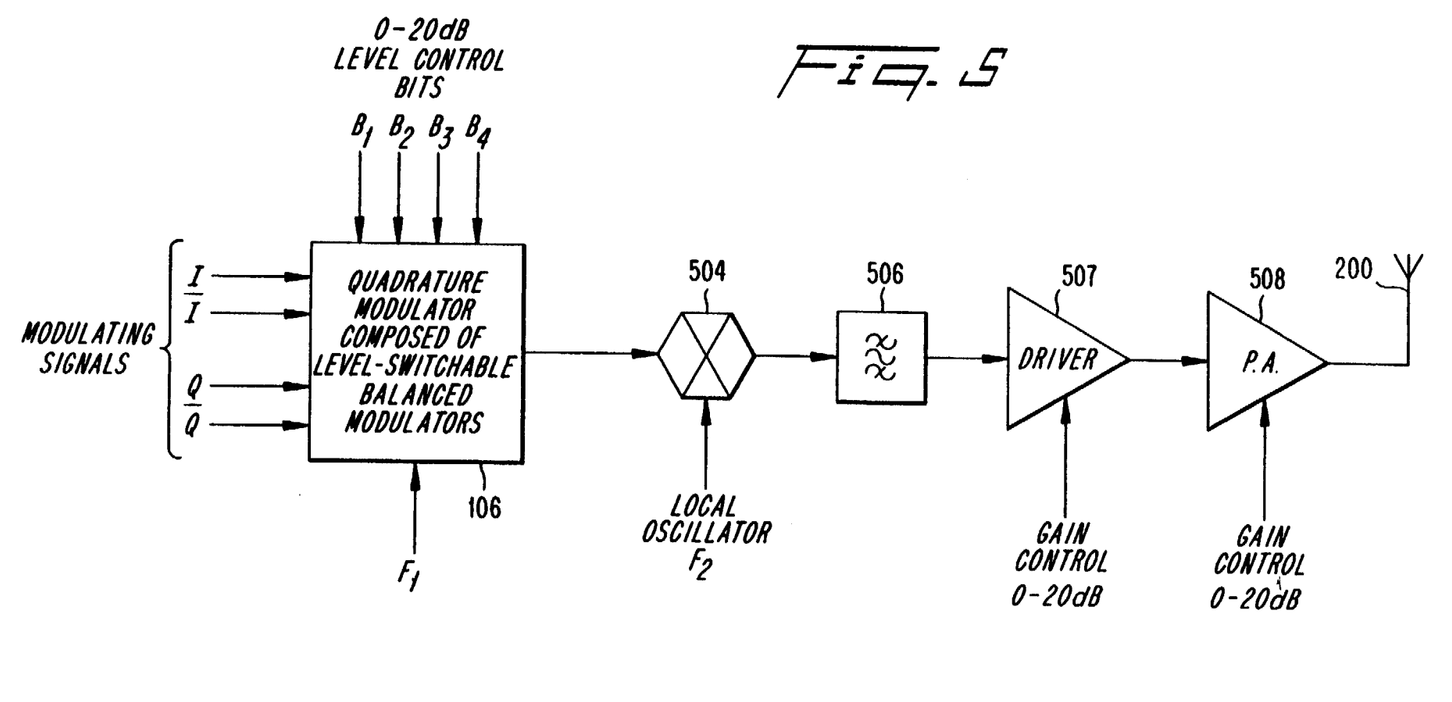
FIG. 5 is a functional schematic of multi-stage power amplifier in accordance with the present invention.

FIG. 5 is a functional schematic of a multi-stage power amplifier 50 in which modulating in-phase (I) and quadrature (Q) signals are input to a quadrature modulator 106. The quadrature modulator 106 includes level-switchable balanced modulators controlled by level control bits $B_1-B_4$ to provide a first 0–20 dB control. A first frequency $F_1$ providing the carrier frequency is also input to the quadrature modulator 106 from the transmitter frequency synthesizer 104. The output of the quadrature modulator 106 is input to an upconverter 504, which is provided with a second frequency $F_2$ from the transmitter frequency synthesizer 104. The upconverter 504 heterodyne mixes the modulated signal (which is at a lower frequency for technical convenience) with the higher, fixed second frequency $F_2$ to translate it to a higher output frequency. Conversely, a downconverter, or super heterodyne mixer, is generally employed in a receiver to convert a high frequency signal received on the antenna to a lower, fixed intermediate frequency at which amplification is more conveniently achieved. In either case, it is advantageous to modulate or demodulate a signal at a lower, fixed frequency and to change the oscillator that drives the mixer to vary the frequency at the antenna.

The output of the converter 504 is input to a bandpass filter 506 and fed to a driver 507. The gain on the driver 57 is controlled between 0–20 dB by power level controller 118. The output of the driver 507 is input to a power amplifier 508, the gain of which is controlled between 0–20 dB by gain control of the power level controller 118. The output of the final amplifier 508 is input to the antenna 102 for broadcast. This circuit permits a total transmission power control range of 0–60 dB. It will be appreciated that variable attenuators may also be used. Switchable and variable attenuators are commercially available from number of sources, such as Avantek, Inc., Santa Clara, Calif.

Figure 6:
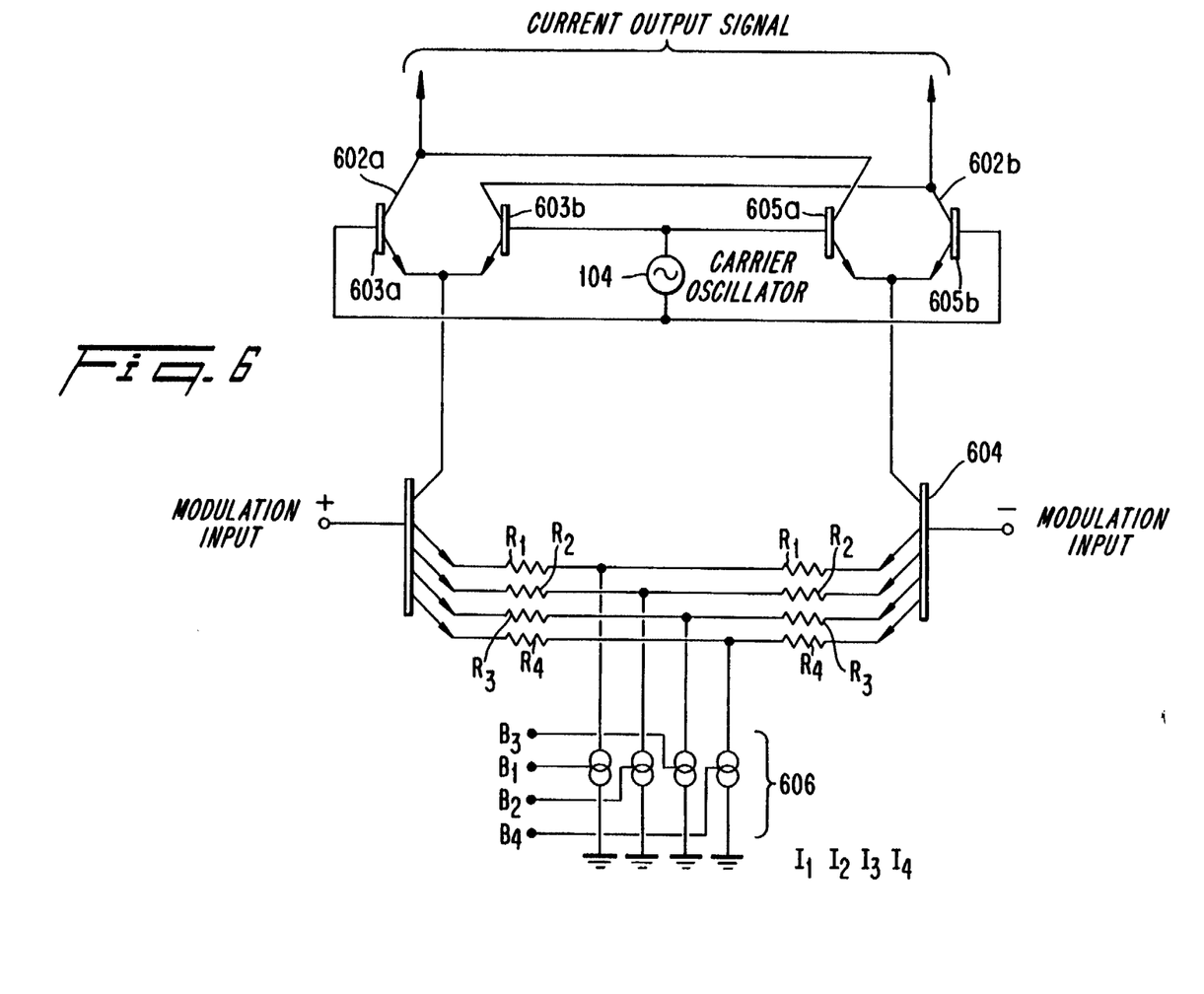
FIG. 6 is a functional schematic of a balanced modulator in accordance with the present invention.

A suitable balanced modulator for the quadrature modulator 106 for controlling gain may be provided as shown in FIG. 6. The circuit of FIG. 6 includes twin balanced modulators 602a and 602b. Each modulator 602 comprises twin paired transistors 603a, 603b; 605a, 605b, the emitters of which are coupled together within each pair. The bases of symmetrically opposing transistors from 603a, 605b; 603b, 605a of each pair are coupled together to form the bridge wherein the local oscillator (transmitter frequency synthesizer 104) supplying the carrier frequency $F_1$ is connected in parallel to the bridged circuit. The collectors of the transistors 603, 605 are cross-linked and form the output of the quadrature modulator 106. The coupled emitters of each balanced modulator 602 are coupled to the collector of multiple emitter transistors 604, the bases of which are controlled by the respective modulation inputs. Each of the emitters of each of the multiple emitter transistors 604 are connected together by respective series connected resistor pairs $R_1-R_4$. The resistor pairs $R_1-R_4$ are center tapped with switchable current generators 606 ($I_1$, $I_2$, $I_3$, $I_4$), which are controlled by control bits $B_1-B_4$. The values of unbypassed emitter resistors $R_1-R_4$ in each balanced modulator 602 can be selected by selectively energizing the tail current sources 606 associated with each center-tapped emitter resistor R₁–R₄, thus resulting in a balanced modulator circuit 60 with a binary programmed output level.

Controlling the transmitted power level can also be achieved by numerically scaling the digital I, Q values generated in the complex modulator 112 before they are converted to analog form for the quadrature modulator 106. The control range is somewhat limited, but the gain can be easily and precisely selected, for example in 0.1-dB steps.

FIG. 2 shows an exemplary base station receiver/transmitter 20 for detecting mobile random accesses in a communications environment of overlapping, ongoing radio traffic signals. An antenna 200 receives a composite signal which is amplified by a low-noise, RF amplifier 202. The amplified signal is spectrally shaped by a filter 204, and a dual analog-to-digital converter 206 converts the filtered analog signal into a stream of complex digitized signals having real or in-phase parts (I) and imaginary or quadrature parts (Q). Alternatively, an intermediate frequency mixing stage may precede the amplifier 202 so that amplification and filtering occur at a lower intermediate frequency.

After the frequency demodulation process, the complex, digitized composite signal is processed by a CDMA subtractive signal processor 208. Because the individual signals to be demodulated are each scrambled with a unique scrambling code generated by the mobile station's control processing unit 116, the CDMA signal processor 208 sequentially descrambles the composite signal with each scrambling code in order of greatest to weakest signal strength. The descrambled signal is decoded by correlation with all of the bi-orthogonal codes possibly used for encoding to extract eight bits of information for each 128-bit bi-orthogonal code word. Correlation may be carried out by using for example the Fast Walsh-Hadamard transform processor described in the present inventor's pending U.S. patent application Ser. No. 07/735,805 filed Jul. 25, 1991 and entitled "Fast Walsh Transform Processor". The decoded information bits are transmitted to a base station control processor 212 for further speech/data processing.

By selecting the scrambling codes corresponding to the signals having the greatest signal strength, the base station CDMA processor 208 demodulates the various overlapping signals in order of predicted signal strength from strongest to weakest. A signal strength tracker and sorter 210 predicts the signal strengths from past observations and orders them. Recognizing that power levels change over time, the signal strength tracker and sorter 210 freely reorders the signal decoding sequence to accommodate relative power level changes. Expected signal strength levels may be predicted based on a history of past power levels by extrapolating a next power level using an estimated change of power level.

A random access by a mobile station 10 using low power levels is detected only after stronger signals are decoded. In addition to decoding information or traffic signals, the base station processor 208 searches for and decodes each coded mobile access signal according to its detected power level. Because the mobile access message is transmitted initially at a low power level, it does not interfere with stronger signals being decoded. As soon as an access message is detected, the processor 208 subtracts the access message from the composite signal so that interference with signals decoded later in the signal strength sorted order is minimized.

The power level of the initial random access message from the mobile station 10 is set by the power controller 118 at a low power level. The power controller 118 gradually increases the transmission power in small increments, e.g., 0.1 dB, after each successive codeword is transmitted. These successive power increases continue for the total number of codewords making up the random access message. Preferably, the power level increases according to a ramp_function with the ramp slope determining the magnitude of the power increase increment. A ramp function is readily implemented and simplifies the signal strength prediction process of the base station signal tracker and sorter 210. Each successive transmission of the random access message by the mobile station 10 occurs at a power level greater than the preceding access message transmission until the base station 20 detects the access message and transmits a reply message to the mobile station 10. Once that reply message is received and the base station 20 indicates that the mobile power level is in the desired signal strength range, the mobile station 10 fixes its transmitted power at a level specified by the base station 20 in the reply message.

It takes approximately 0.5 milliseconds to serially transmit a single 128-bit codeword. If the mobile increases its transmitted power level by only 0.1 dB per codeword, the power level's rate of change is 200 dB per second, which will be recognized as a high rate of change. Since the typical received power level range for traffic or access signals is on the order of 60 dB, fewer than six hundred codewords need be transmitted before the base station detects the access message. Thus, the worst-case delay in access detection is only about 300 milliseconds. In this way, the present invention allows mobiles to randomly access the cellular network without noticeable delay to the mobile subscriber and without interference to other communications signals.

To simplify the base-station's task of detecting random access messages, the first two codewords out of every 42-codeword message are fixed at a first value, A. Thus, a 42-codeword message begins "AA . . . " For simplicity, message lengths are chosen to be 42 codewords because that is also the length of speech coder frames in the present system. When transmitting speech traffic, the first two codewords also take on the value "AA . . . " to indicate when speech frames are transmitted in full, but may also take on a second value "BB . . . " when it is desired to indicate that the remaining 40 codewords in the following speech frame are not going to be transmitted because the speaker was momentarily silent. This so-called discontinuous transmission or "DTX" is described in commonly assigned U.S. patent application Ser. No. 07/866,555 entitled "Discontinuous CDMA Reception" filed on Apr. 10, 1992 now U.S. Pat. No. 5,239,557.

The base station receiver's capability to search for occurrences "AA . . . " or "BB . . . " is therefore, in the preferred system, used for dual purposes of identifying DTXed speech frames as well as random access attempts.

The staggering of the relative position of occurrences of "AA . . . " codewords is linked to the choice of codeword so that, for a particular codeword, the receiver can predict when "AA" should occur, and thus does not have to search for AA on all codewords in every frame.

If the AA sequence is not detected immediately because the first mobile access attempt was made at a low power level, the next time the base receiver searches for AA the power level will have increased 42×0.1 dB, i.e., 4.2 dB. Although it appears that access attempts could equally well have been increased in power in one 4.2 dB step between attempts, instead of in a smooth ramp-function fashion of 42 smaller steps of 0.1 dB, it is much simpler for the operation of the base station 20 after detection of a random access attempt that the mobile station's power should increase smoothly, as the base station 20 then decodes every codeword and is able more easily to track small changes of power level between codewords.

One objective behind the invention is that the base station 20 should detect random access messages while they are still at a power level too low to interfere with ongoing traffic, and subsequent to detection, to subtract them out as their power rises toward a target level. If a random access was below a detectable level on a previous attempt, it is unlikely that a 4.2 dB increase in signal level before the base station looks for it again would represent a significant interference hazard.

Figure 3A:
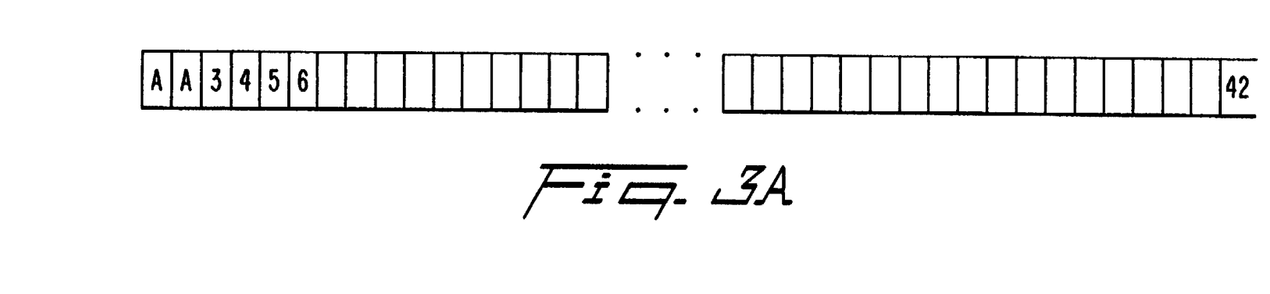
FIG. 3A is an exemplary signal format for a random access message from a mobile station.

An exemplary random access message sequence is illustrated in FIG. 3A, which shows forty-two codewords in the sequence produced by the control processing unit 116. The first two 128-bit codewords A, A have fixed bit patterns that are recognized by the base station control processor 212 as random access messages; the remaining forty codewords 3, 4, 5, 6, ..., 42 contain the mobile station's identification code/telephone number in error-correction coded form and communication information.

The codeword A is one of preferably one hundred twenty-eight possible Walsh-Hadamard codewords that are used to indicate random access, and is scrambled with one of a number of reserved scrambling codes unused for traffic. The base station 20 descrambles the received signal with each of the reserved scrambling codes, then correlates for "A" to determine whether a random access has begun. The base station 20 must detect one of the A codewords in order to detect a random access start, and once A is detected, the base station 20 demodulates the remaining forty codewords. The codewords A, A are also used to synchronize communications between the mobile station 10 and base station 20 as described in more detail below.

Figure 3B:
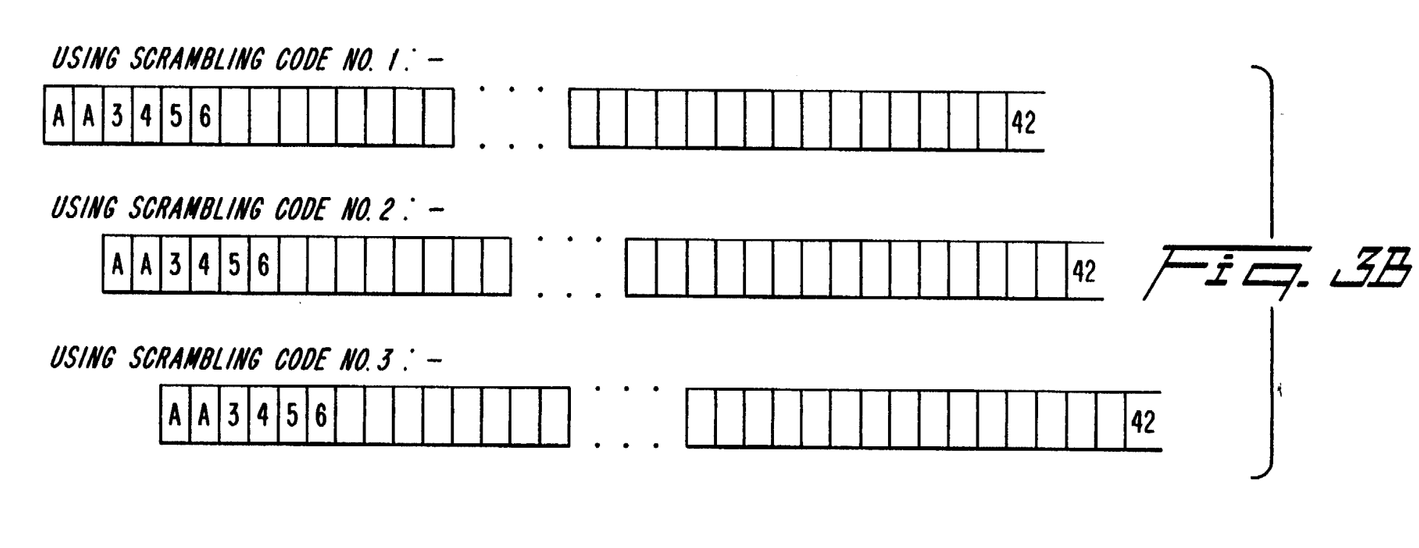
FIG. 3B illustrates positional variation of random access message startcode sequences.

To avoid overloading the base station 20 by requiring it to look for all the AA sequences for all scrambling codes in the same 128-bit blocks of the 42-codeword sequence, the position of the AA sequence is varied in accordance with the scrambling code used, as shown in FIG. 3B for three scrambling codes. Similar position variations are provided for the remaining scrambling codes. In this way, the base station 20 searches for the codewords A, A at different times for each scrambling code, and so avoids the processing load that would occur if the AA sequences for all scrambling codes had to be detected simultaneously.

In a preferred embodiment of the present invention, each mobile station random access message transmission uses a scrambling code selected from several available scrambling codes that are not presently allocated to traffic communications. These are indicated in a broadcast message transmitted by the base station 20 over a designated CDMA channel on the same frequency. A mobile station 10 attempting an access to the network tunes to that frequency and scans the broadcast list of available scrambling codes. The mobile station 10 selects an available code and transmits a scrambled random access message. The presently unused scrambling codes on a predetermined frequency $Fd_1$ are identified in a broadcast transmission using one of the CDMA signals overlapping on frequency $Fd_1$. Preferably this is the strongest of the downlink signals on first frequency $Fd_1$ so it can be decoded by any mobile station 10. This effectively acts as a "calling channel" in which the signal serves as a pilot signal to assist the mobile demodulator. The aim is that each frequency channel is self-supporting as far as broadcasting information is concerned. Once the access is detected and recognized as an access code, the base station control processor 212 removes that code from the broadcast list and proceeds to decode the access message as described previously. Alternatively, the access codes currently in use can be broadcast as a list so that the mobile station 10 can select from those remaining on an internally stored list.

Random access transmissions start at a specific boundary (i.e., the start of a 42-codeword message block "AA ... ") that divides a mobile access message into a specific number of codewords, e.g., 42. Each two word scrambled start code AA is staggered in time, as explained above, to distribute as evenly as possible the base station's task of searching for random access messages. As a result, the control processor 212 only needs to search at one time interval for a fraction of the possible random access scrambling codes for each block decoding operation. The CDMA signal processor 208 also searches for random accesses using the scrambling codes of mobile stations 20 in neighboring cells that are received at a signal strength strong enough to produce interference.

Time-alignment information is provided by the base station transmitter 214 to a transmit timing controller 120 from the processing unit 116. In response to detecting a random access message, the base station transmitter 214 transmits reply information to the mobile processing unit 116, such as the timing difference between the time at which the mobile access transmission was received by the base station 20 and a preset, target timing value. Other information includes the difference between the signal strength of the detected random access message and a predetermined signal strength.

The mobile station 10, even before random access, listens to the calling channel (i.e., the strongest of the CDMA signals overlapping on the same frequency). It locks to this signal and thus has established timing synchronization with the base station 20 at the 42-codeword frame level as well as at the spreading code chip level.

The mobile station 10 has from the beginning been listening to the calling channel broadcast from the base station 20. The signal structure on the calling channel also consists of 42-codeword messages beginning with "AA ... ". The mobile thus knows the time of occurrence of AA on the downlink calling channel, from which the time-stagger of all other codewords is defined. For example, if we use the notation that the calling channel employs scrambling code $C_0$, and traffic channels may use scrambling codes $C_1$, $C_2$, etc., then the time of occurrence of AA in the signal scrambled with code $C_1$ will be two codewords after the time of occurrence on the calling channel; likewise, the time of occurrence of AA in the signal scrambled with codeword $C_2$ will be four codewords after AA on the calling channel, and so forth.

| | | |
|---|---|---|
| Calling channel: | ....AA.................AA........ | |
| Signal using C1: | ......AA.................AA........ | |
| Signal using C2: | ........AA.................AA...... | |

It is necessary to obtain synchronization to a finer resolution than merely determining the 0.5 mS slot in which the first A might occur. Each codeword such as A in fact consists of 128 "chips". "Chips" in CDMA terminology is really the same as "bits", and is used to signify that CDMA in fact transmits many such chips to convey each bit of information.

To correctly descramble a codeword and perform a 128-bit correlation it is necessary to align the descrambling code with the received signal to an accuracy of one chip. This is what is meant by having achieved synchronization at the chip level as well as at the frame structure level. Synchronizing to the frame structure means finding at which one of 42 possible codeword positions in the frame structure the AA sequence is expected; synchronization to chip resolution means determining to which of 128 possible chip positions within that codeword period the descrambling code must be aligned. This is actually done by trying several positions and analyzing how much correlation is found on each position.

The above refers to operation of the mobile receiver; however, the timing so found is conveyed from the mobile receiver to the mobile transmitter parts such as block code generator and scrambler 114 so that they produce signals with a frame, codeword and chip alignment that is related to that received from the base station 20. In other words, the base station 20 is the master timing reference to which all mobile stations 10 synchronize and thus are able to transmit signals with a determined time relation.

Due to unequal distances from different mobile stations 10 to the same base station 20, however, even if mobile stations 10 transmitted signals aligned at the same instant in time, they would not be received aligned at the base station 20. Therefore the transmit code generator 114 is told by the control processing unit 116 to produce transmit signals a little earlier to account for the loop propagation delay from base to mobile station 10 and back again. The exact amount of timing advance needed may be determined by the base receiver measuring the time alignment of the received mobile signals, determining how early or late they are with respect to a predetermined position, and then transmitting a message to the mobile station 20 giving the amount (e.g., number of chips + or −) that the mobile station 10 shall adjust its time advance.

When the mobile station 10 makes a first transmission to the base station 20 during random access, it relates its transmit frame, word and chip timing to the timing it has received. Thus, the base station 20, by comparing its timing on the outgoing calling channel with the timing of the received mobile signal can determine the round trip delay. The base station 20 determines how early or late the mobile timing is with respect to a predetermined time alignment desired for all mobile signals to be received. It can then, in the reply confirming reception of the random access transmission, send information to the mobile station 10 enabling the mobile station 10 to adjust its transmit timing to the right position. This information could either be an absolute timing advance for the mobile station 10 to use (in which case the base station 20 needs to know what timing advance the mobile station 10 was already using), or the amount of adjustment or Δ the base station 20 wants the mobile station 10 to apply (in which case the base station 20 does not need to know the amount of timing advance the mobile station 10 is already using).

The choice between these is not critical to the invention, and is a matter of system philosophy. At present the preferred approach is that the mobile station 10 includes, in its random access transmission, not only its mobile ID but also details of the power level and timing advance that the transmission used. Then the base station 20 additionally adjusts the signal and sends the absolute values back to the mobile station 10. The mobile station 10 then continues to ramp its power and its timing at the same, gentle rate until it hits the target values received from the base station 20 most recently.

As an example of a mobile random access message, 40 codewords of data present in the 42-word frame and a rate ½ error correction code, yield 20 bytes of information after decoding. These bytes can be deployed in the random access message as follows:

| | |
|---|---|
| Message type: | 1 byte |
| Message number: | 1 byte |
| Mobile Identification number: | 4 bytes |
| Power level in use to nearest 0.5db: | 1 byte |
| Timing advance in use to nearest ¼ chip: | 1 byte |
| Called number (mobile originated call): | 8 bytes |
| Spare bytes for future use: | 2 bytes |
| Cyclic redundancy check code: | 2 bytes |
| Total | 20 bytes |

The reply from the base station to the mobile upon detection of first transmission can be of similar form:

| | |
|---|---|
| Message type: | 1 byte |
| Message number: | 1 byte |
| Mobile Identification number: | 4 bytes |
| Power level in use to nearest 0.5db: | 1 byte |
| Timing advance in use to nearest ¼ chip: | 1 byte |
| Spare bytes for future use: | 11 bytes |
| Cyclic redundancy check code: | 2 bytes |
| Total | 20 bytes |

There are 42 codewords in a frame, the frame being the coarsest unit of timing resolution. Each codeword contains 128 chips, codewords and chips being finer units of timing resolution, but in addition, a chip, which in the preferred system is about 4 microseconds long is generated by dividing an even higher frequency clock (i.e., producing pulses even shorter than 4 uS) by some integer. For example, in one implementation, a 12.8 MHz clock is divided by 48 to produce pulses of one chip duration. Each pulse of the 12.8 MHz clock is thus of 1/48th of a chip duration, so the present system can fine-tune any timing adjustment to fractions of a chip resolution if need be. In practice, we do so also as it is desirable not to alter timing in large steps for the same reason as it is not desirable to alter power level in large steps, but to ramp smoothly in smaller steps between one value and the next. It is only necessary to specify the target or destination value to an accuracy or resolution of ¼ of a chip period, however. For example, if it is detected by the base station receiver that a particular mobile signal is arriving between 0 and 1 chip earlier than the others, on average say 0.71 chips, this can be rounded up to ¾ of a chip and the timing advance byte value would be changed by 3 and conveyed to the mobile in a timing adjustment message. Over the next few codewords, the mobile would ramp its timing in 1/48th of a chip steps per codeword, taking in total 36 codewords or around 18 mS to make the adjustment of ⅜ chip. This is fast enough for practical purposes.

In the above format, the "spare bytes" may be used by the base station 20 to command the mobile station 10 to switch to a less heavily loaded frequency channel.

An example of the use of the above message format assumes a mobile station 10 begins a random access transmission at the lowest power level. If a signal at this level has a chance of establishing communication, the mobile station 10 cannot be very far away from the base station 20, and therefore zero timing advance is used. According the first message from the mobile station 10 contains:

Power byte=0;

Timing advance=0.

The mobile station 10 continues to increase its power by approximately 0.1 dB per codeword so that the first repeat message will begin at about 4.1 dB higher power than the first message. With 0.5 dB quantizing of the power byte, the value included in the message would be 9. No change to the timing advance would be needed until the power levels reached much higher values without an acknowledgement from the base station 20, indicating that the mobile station 10 is at a significant distance. The maximum distance normally envisaged for cellular communications is 30 Km, for which 200 uS relative timing advance is needed to compensate for the round-trip delay. Thus, at maximum power, the timing byte included in the random access repeat message would indicate an advance in the 200 uS range. Because other reasons than distance can require the mobile station 10 to use higher powers, for example local shadowing, it can be desirable not to employ the maximum time advance but about 100 uS less, which leaves 100 uS to be coped with by the base station's capacity to accept delayed signals up to a certain maximum delay of, for example, 32 chip periods, a chip being for example 4 uS long. With these example figures, ¼ chip is 1 uS long, and the timing byte value represents microseconds of timing advance currently employed by the mobile station 20.

If the mobile station signal was first detected by the base station 20 at the seventh attempt when it had reached about half the maximum power (in dBs) (i.e., a power byte value of 60), the mobile station 10 employed a timing advance byte value of 40, for example. The base station 20 detected the mobile station 10 while its signal was still quite weak and it is desirable for the mobile station 10 to continue increasing power by, for example 16 dB, to bring it into the target range. Moreover, the mobile signal was detected to be, for example, 20 uS late compared with the base station's preferred timing window. The base station 20 acknowledgement message would thus contain the values:

Power to use byte=60+16/0.5=92.

Timing to use byte=40+20=60.

The mobile station 10, upon receipt of this message, would continue to ramp its power and timing until the commanded values are reached.

Due to processing delay in the base station 20 and the mobile station 10, or failure due to temporary radio noise to detect the first acknowledgement message, it is probable that the mobile station 10 will make at least one more attempt (e.g., power=68, timing=42) before an acknowledgement message is received. This will also be detected by the base station 20 at a higher power level that is now within 12 dB of the target range and within 18 uS of the desired optimum timing. The base station 20 thus sends another acknowledgement message with the values:

Power to use byte=68+12/0.5=92

Timing to use byte=42+18=60

The base station 20 thus gives the mobile station 10 consistent instructions, so that the mobile station 10 will eventually adopt the desired parameters.

Based on this information, the processing unit 116 directs the timing controller 120 to advance the timing of the transmission of the mobile access message by a timing advance factor to compensate for the propagation delay caused by the distance between the mobile station 10 and the base station 20. The access transmission timing factor may be zero and then increase to effect earlier transmission times as the access message transmission power level increases. The greater the power level required, the greater the distance between the mobile station 10 and the base station 20, and the earlier the access message must be sent to be properly time aligned. It is preferable for the base station transmitter 214 to broadcast information that will allow the mobile station control unit 116 to more accurately adapt the timing controller 120 to the time advance/power level increase relationship to the propagation law pertaining to that base station's cell, in the manner described above. Such information includes the base transmitter's effective radiated power and the radial propagation loss profile in different directions.

An issue that is also solved by the message exchange between mobile station 10 and base station 20 is to ensure that the mobile station 10 can receive the base station transmissions using the traffic scrambling code rather than the calling channel code, and to confirm this to the base station 20 so that the base station 20 can cease transmissions on the calling channel in order to save calling channel capacity.

Moreover, the other mobile stations 10 in the cell could be disturbed by the sudden appearance of a new base station transmission at arbitrary power level. The same random access issue of avoiding interference by sudden appearance of a new code therefore has to be solved in the reverse direction.

The preferred means for the base station 20 to begin transmission on a previously unused code is to begin at a power level lower than any of the ongoing signals and to ramp it up slowly, just like the mobile station 10, at the approximate rate of 0.1 dB per 0.5 mS codeword. At the same time, the code is removed from the list of unallocated codes, or rather, added to the list of used codes broadcast from the base station 20.

The format for the list of codes in use broadcast for the base station 20 is:

| | |
|---|---|
| Number of codes in use | (1 to 24) 5 bits |
| Code number of strongest signal | (1 of 31) 5 bits |
| Code number of 2nd strongest signal | (1 of 30) 5 bits |

-continued

| | |
|---|---|
| Code number of 15th strongest | (1 of 17) 5 bits |
| Code number of 16th strongest | (1 of 16) 4 bits |
| Code number of 23rd strongest | (1 of 9) 4 bits |
| Code number of 24th strongest | (1 of 8) 3 bits |
| Total bits 5 + 8 × 5 + 8 × 4 + 4 × 3 + 2 × 2 + 1 = 115 bits | |

Therefore, within a 20-byte data message, the bytes can be allocated to the above broadcast message as follows:

| | |
|---|---|
| Message type: | 1 byte |
| Code order as above: | 15 bytes |
| Spare for future use: | 2 bytes |
| Cyclic redundancy check code: | 2 bytes |
| Total: | 20 bytes |

This message may be read by mobile stations 10, other than that attempting random access, to warn them of the imminent commencement of transmission with a previously idle code. It is also readable by an idle mobile station 10 and may be used to determine the traffic loading on each frequency channel it scans, thus enabling it to choose to make a random access on the most lightly loaded frequency channel.

Because the power level with which the base station 20 begins transmission is unlikely to be more than 35 dB below the strongest signal, it takes only 360 codewords (180 mS) to increase from weakest to strongest position at the rate of 0.1 dB per codeword. During this time, in the case of a mobile station 10 originated call, the base station 20 can already pass the called number to the land network so that the delay in the land network making connection to the called subscriber is in parallel with the completion of random access and not in series with it. In other words, making the land-line connection occurs simultaneously with the completion of random access rather than sequentially.

During this period, the mobile station 10 continues to demodulate the common calling channel as well as listening for the base signal to appear using the mobile's own scrambling code. The base station 20 transmits the same data on both the calling channel and the mobile's code, thus facilitating detection of the signal by the intended mobile station 10 as well as subtraction of the signal by other mobile stations 10. When the mobile station 10 has successfully detected the signal using its own scrambling code, it acknowledges this fact to the base station 20 by use of an uplink acknowledgement message format as follows:

| | |
|---|---|
| Message type: | 1 byte = "acknowledge" |
| Message number: | 1 byte |
| Moble Identification number | 4 bytes |
| Message number of base message acknowledged: | 1 byte |
| Signal strength ordering of detected own code: | 1 byte |
| Other base calling channel strengths: | 8 bytes |
| Spare bytes for future use: | 2 bytes |
| Cyclic redundancy check code: | 2 bytes |
| TOTAL | 20 bytes |

The mobile station 10 repeats this message with incrementing message numbers until the base station 20 ceases to transmit the power and time alignment message type and sends a new message type or traffic. The progress of the base/mobile interchange thus achieves the objective of the invention: the establishment of a duplex, base-mobile link on a unique channel. Once the base station 20 is satisfied with the power level and time-alignment, it sends a "traffic channel allocation" message to the mobile station 10. The traffic channel allocation message indicates to the mobile station 10 that the random access has been accomplished and that the mobile station 10 may proceed to the next stage of call set-up. For mobile initiated call set-ups, the mobile station 10 transmits the telephone number of the party being called. When the traffic channel allocation message is sent to the mobile station 10, the mobile station 10 switches to the code/frequency parameters indicated in the message. Thus, a closed-loop control of timing and power level is formed between the mobile station 10 and the base station 20. Preferably, the power level control loop functions in accordance with the system described in a pending application "Duplex Power Control, " U.S. patent application Ser. No. 07/866,554, filed on Apr. 10, 1992, and incorporated above by reference. More generally, however, the traffic channel allocation message may include a command to change a CDMA code from a random access code which may be common to all mobiles attempting random accesses to an assigned code for traffic communication. In addition, the traffic channel allocation message could include a command to change to another frequency. The procedure beyond this point is termed the completion of "call set-up" and could include other message exchanges for the purposes of authenticating the mobile station 10 in the accessed network, or vice versa. In addition, the transmission power levels that the mobile station 10 and base station 20 adopt beyond the cessation of power and time alignment messages may be controlled using the technique of "Duplex Power Control" disclosed in a separate application, Ser. No. 07/866,554 mentioned above.

To compensate for time-dispersion and echoes on the radio channel as well as uncertainty in the time-of-arrival of random access messages, the CDMA signal processor 208 processes several different shifts of the received, digitized signal samples and combines the decoded results of each shift in a conventional RAKE detector receiver.

Figure 4A:
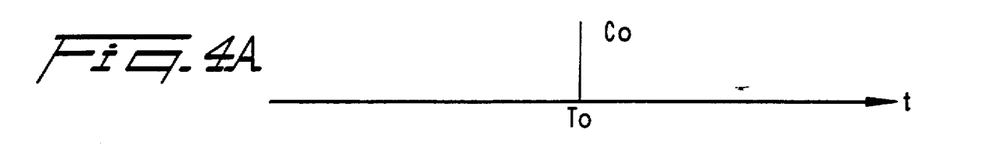
FIGS. 4A–4E illustrate the underlying operation of a RAKE receiver.
Figure 4B:
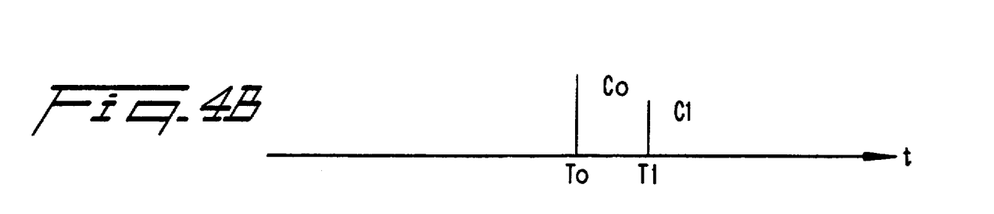
Figure 4C:
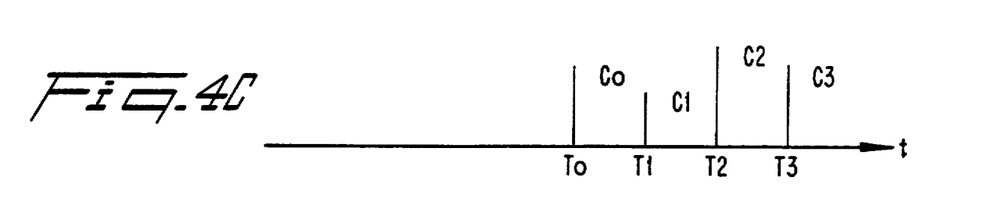

A RAKE receiver anticipates that the signal has come through a channel that adds delayed echoes. FIG. 4A shows that a desired component/shift of the originally transmitted signal appears aligned at a distinct point in time To at amplitude Co. If on the other hand an echo is added over the transmission path causing the desired signal component also to appear at T1 with amplitude C1, then the signals appear as represented in FIG. 4B. In general, the RAKE receiver anticipates a number of echoes to be received at To, To+dT, To+2dT, To+3dT... and with respect amplitudes Co, C1, C2, C3, etc., as shown in FIG. 4C.

The positions and amplitudes expected are predicted from past history and a number of RAKE taps placed at the expected positions in a delay register to collect the echoes, which are then added with appropriate weights.

Thus, the RAKE receiver is able to search for a signal at an earliest possible time of arrival To by placing one RAKE tap at To; the receiver is also able to search for the signal arriving at a delayed time To+dT by placing a single RAKE tap at To+dT, and so on. The total possible spread of the taps on the delay register determines the total amount of uncertainty in the time of arrival that can be searched. In the preferred system, up to 32 chips of time delay can be searched, corresponding to up to around 128 uS time delay.

Figure 4D:
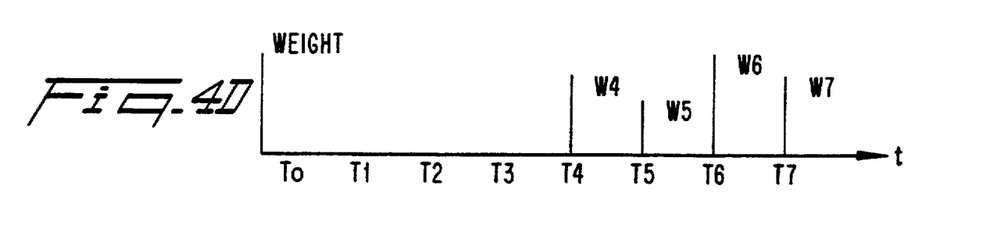
Figure 4E:
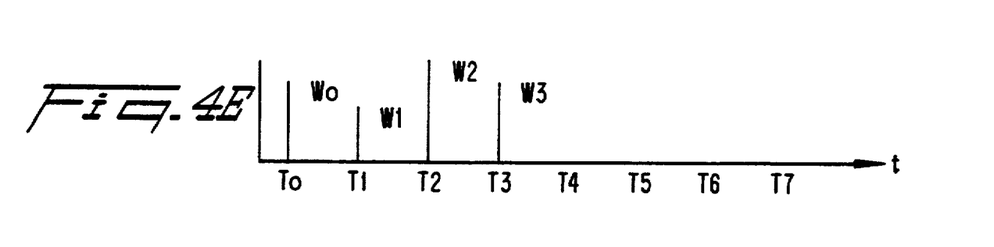

When taps containing significant energy have been identified, detection of the signal proceeds by setting several RAKE taps to collect energy from those time shifts and add the taps with suitable weighting to maximize the signal to noise and interference ratio. In the preferred system, the total spread of taps that are combined in this way is 8 chips; that is, the taps that contain significant energy can be delayed by up to 32 chips, but all those selected to be added for detection have to lie within an 8-chip window somewhere in that 32 chip range. This is more a practical simplification that is found to be permissible without undue loss of performance, than a matter of principle. To illustrate how manipulating the RAKE taps adapts the receiver to accept signals that are more or less delayed, FIG. 4D shows taps 4, 5, 6 and 7 being non-zero while taps 0, 1, 2 and 3 are given zero weight. This arrangement would combine energy received starting at the first time position T4, and decode it. In FIG. 4E, taps 4, 5, 6 and 7 are zero but taps 0, 1, 2 and 3 have the values that taps 4, 5, 6 and 7 had in FIG. 4D. The RAKE receiver is thus adapted to receive precisely the same signal as in the first case, just when an earlier time of arrival To instead of T4. Thus, by adjusting the positions and relative values of the tap weights, the RAKE receiver is able to receive signals with more or less propagation delay.

A similar issue of interference avoidance may exist when a call is terminated. There is less of a danger of causing interference due to the sudden disappearance of a signal than due to the sudden appearance of a new signal, but even the residual danger may be eliminated by adoption of a soft termination procedure as follows:

After the base station 20 or mobile station 10 has transmitted the last traffic frame, it goes into the discontinuous transmission mode more fully described in a U.S. patent application Ser. No. 07/866,555, entitled "Discontinuous CDMA Reception" filed on Apr. 10, 1992 now U.S. Pat. No. 5,239,557. This removes 40 out of the 42 codewords transmitted per frame in a manner which other receivers are aware of, leaving only the two codewords out of the 42 designated as "DTX FLAGS" being transmitted. These are transmitted at gradually diminishing power levels equivalent to −4 dB per 42-word frame, approximately. After 10 frames the signal level has been reduced 40 dB and the transmission can now be terminated, this having taken only about 200 mS. The base station 20 then removes the access code used from the broadcast list of codes in use, so that another mobile station 10 is free to start a random access on that code.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method for minimizing co-channel interference caused by radio communications initiated between at least one of a plurality of first radio stations and a second radio station, comprising the steps of:

communicating from said at least one of a plurality of first of radio stations to said second radio station using the same radio frequency subject to co-channel interference;

transmitting from said at least one first radio station an access message at a relatively low power level;

determining whether said access message has been detected by said second radio station;

retransmitting said access message at an increased power level until said access message is detected; and upon detecting said access message, transmitting power setting information including a specific power increase quantity for said first station from said second station.

2. A method according to claim 1 wherein said first station is a mobile radio telephone and said second station is a base station.

3. A method according to claim 1 wherein said access message includes an access code and an identification code of said first station.

4. A method according to claim 1 wherein said access message is transmitted using spread-spectrum signal coding.

5. A method according to claim 4 wherein said access message includes orthogonal block error-correction codes.

6. A method according to claim 4 wherein said transmitting step includes:

scrambling said access message using a scrambling code selected from a reserved group of scrambling codes.

7. A method according to claim 6 wherein said scrambling codes are identifiable from information broadcast on a common calling channel.

8. A method according to claim 1 further comprising:

acknowledging at said second station reception of said access message.

9. A method according to claim 8 wherein said acknowledging step includes commanding said first station to discontinue after a specified delay power level increases.

10. A method according to claim 1 wherein a time of transmission of said access message is based on a power level currently in use.

11. A method according to claim 8 wherein acknowledging step includes transmitting time alignment information.

12. A method according to claim 8 wherein acknowledging step includes transmitting power adjustment information.

13. A method according to claim 1 further comprising the step of terminating said radio communication including gradually diminishing said power level and terminating said communication when said power level has diminished by a predetermined extent.

14. A method according to claim 13 wherein said terminating step includes entering a discontinuous transmission mode.

15. A mobile radio station for communicating with at least one other radio station, comprising:

communicating from said mobile radio station to said at least one other radio station using the same radio frequency subject to co-channel interference;

means for transmitting from said mobile radio station to said at least one other radio station a random access message at a relatively low power level;

means for detecting an reply message from said at least one other radio station; and means for commanding said transmitting means to retransmit said random access message at an increased power level if said reply message has not been detected to include an acknowledgement supplying power setting information comprising a specific power increase quantity.

16. The mobile station according to claim 15, wherein said retransmission commanding means increases said power level according to a ramp function.

17. The mobile station according to claim 15, wherein said transmitting means includes:

means for selecting a scrambling code from a list of scrambling codes broadcast from said other radio station to generate said random access message.

18. The mobile station according to claim 15, further comprising:

means for adjusting the time of retransmission of said access message based on said increased power level.

19. A communications system with minimized co-channel interference, comprising:

plural mobile radiotelephone stations, each mobile station including:

means for transmitting an access message initially at a relatively low power level;

means for regulating the power level of said transmitting means; and control means for controlling said regulating means depending on whether said access message has been detected;

at least one base station including:

means for receiving a composite of overlapping signals transmitted from said mobile stations on the same frequency channel subject to co-channel interference;

means for detecting said access messages; and means for transmitting a reply message including power setting information comprising a specific power increase quantity to the mobile station corresponding to said detected access message.

20. The system according to claim 19, wherein said base station further comprises:

means for ordering received signals including said access messages according to signal strength;

means for selectively decoding the strongest signal; and means for removing said decoded signal from said received composite signal.

21. The system according to claim 20, wherein each mobile station includes:

means for encoding access messages using orthogonal or bi-orthogonal codes to produce coded access messages; and means for scrambling said coded access messages using unique scrambling codes.

22. The system according to claim 21, wherein said scrambling codes are reserved for random access messages.

23. The system according to claim 22, wherein said base station transmitting means broadcasts a list of said reserved scrambling codes that enables the mobile station to determine an available access code.

24. The system according to claim 22, wherein said base station transmitting means broadcasts a list of said reserved scrambling codes separate from scrambling codes used for other radio communications.

25. The system according to claim 22, wherein said base station transmitting means broadcasts a list of said reserved scrambling codes used for other radio communications.

26. The system according to claim 19, wherein said access message includes a mobile station identification code and a random access code.

27. The system according to claim 19, wherein each mobile station includes means for adjusting the time of transmission of said access message based on said regulated power level; and means for detecting time alignment information in said reply message.

28. The system according to claim 27, wherein said base station includes means for determining the difference between the signal strength of said random access message detected at said base station and a predetermined signal strength.

29. The system according to claim 28, wherein said determining means determines a time difference between the time said random access was detected and a predetermined time.

30. The system according to claim 19, wherein said receiving means includes means for correlating with a predetermined signal spreading code associated with said access messages.

31. The system according to claim 30, wherein said detecting means is a RAKE detector.

32. The system according to claim 19, wherein said base station detecting means searches for particular access messages at staggered time intervals.

33. A method for establishing radio communications between at least one of a plurality of first radio stations and at least one second radio station, comprising the steps of:

selecting, by one of said first stations, a lightly loaded channel subject to co-channel interference of said at least one of said second stations; and, following a random access procedure including selecting, by said first station, a scrambling code identified from a list of codes broadcast by said second station;

transmitting, by said first station, a call initiation message including said selected code at a relatively low power level; and gradually increasing, by said first station, said power level of said transmitted message until an acknowledgement message is received from said second station, said acknowledgement message including a specific power increase quantity.

34. A method according to claim 33, wherein said channel selection step includes receiving and decoding signals on channels from one or more of said second radio stations at various radio frequencies;

determining the load on each received channel; and selecting a lightly loaded channel with clear reception qualities.

35. A method according to claim 33, wherein said random access procedure further includes starting said random access procedure upon receipt of an call initiation signal transmitted by one of said first station and said second station.

36. A method according to claim 35, wherein said random access procedure further includes determining, by said second station, whether a code from said list of codes is being transmitted by a first station;

transmitting, by said second station, an acknowledgement message upon receipt and decoding of said transmitted message using said selected code;

transmitting, by said first station, a second message to said second station upon detection of said acknowledgement message; and ceasing transmission of said acknowledgement message by said second station upon receipt and decoding of said second message.

37. A method according to claim 33, wherein said acknowledgement message from said second station is transmitted on a common calling channel and includes timing adjustment information for timing further transmissions from said first station.

38. A method according to claim 36, wherein said second station transmits said acknowledgement message initially at a low power level and gradually increases said power level until receipt of said second message.

39. A method according to claim 36, wherein said second message includes signal strength information.

40. A method according to claim 35, wherein said first station receives said acknowledgement message from both common calling channel and said selected channel.

41. A method according to claim 33 further comprising the step of terminating said communication including gradually diminishing said power level of said transmitted message and terminating said communication when said power level is diminished by a predetermined extent.

42. A method for minimizing interference caused by termination of radio communications between a first radio station and a second radio station, comprising the steps of:

entering a call termination mode after a last communication segment;

gradually diminishing a transmission power level; and terminating transmission when said power level has diminished by a predetermined extent.

43. A method according to claim 42, wherein said termination mode is a discontinuous transmission mode in which frames of data are reduced to no more than two flags.

* * * * *